United States Patent [19]
Hutson et al.

[11] 3,940,172
[45] Feb. 24, 1976

[54] VACUUM-ACTUATED PICK-UP INSTRUMENT

[75] Inventors: Clifford L. Hutson, Glendale; Leonidas C. Miller, Monterey Park, both of Calif.

[73] Assignee: Clifford L. Hutson, Glendale, Calif.

[22] Filed: Apr. 22, 1974

[21] Appl. No.: 462,591

[52] U.S. Cl. .................. 294/64 R; 15/419; 251/344
[51] Int. Cl.² ............................................ B25J 7/00
[58] Field of Search ......... 294/64 R; 269/21; 279/3; 251/344; 137/625.25; 15/419, 415, 344

[56] References Cited
UNITED STATES PATENTS

| | | | |
|---|---|---|---|
| 1,449,358 | 3/1923 | Weber | 294/64 R |
| 3,071,402 | 1/1963 | Lasto et al. | 294/64 R |
| 3,843,183 | 10/1974 | Hutson | 294/64 R |

FOREIGN PATENTS OR APPLICATIONS

| | | | |
|---|---|---|---|
| 248,952 | 7/1969 | U.S.S.R. | 294/64 R |

OTHER PUBLICATIONS

IBM Technical Disclosure Bulletin; Delgado et al.; "Vacuum Pick-up Device," Vol. 9, No. 7, Dec. 1966, p. 950.

Western Electric; Brossman; "Improved Vacuum Pick-up Tool for Semiconductor Wafers"; T.D. No. 27, July 1972, p. 3.

*Primary Examiner*—Evon C. Blunk
*Assistant Examiner*—Jeffrey V. Nase
*Attorney, Agent, or Firm*—Paul A. Weilein

[57] ABSTRACT

A pencil-size instrument body has a manually operable valve to control an air passage connected to a vacuum source. A first hollow axle projecting forward from the body carries a rotary finger control member. A rigid air tube of small diameter is mounted by one end in a second hollow axle and constitutes therewith a replaceable probe assembly that plugs into the first hollow axle. A rotary hub member on the second hollow axle is operated by the rotary finger control member and is connected to the end of a coil spring that rotatably embraces the rigid air tube. The second end of the coil spring is connected to a rotary tip member on the rigid air tube that picks up small objects by vacuum action and rotates the objects under control of the finger control member.

13 Claims, 12 Drawing Figures

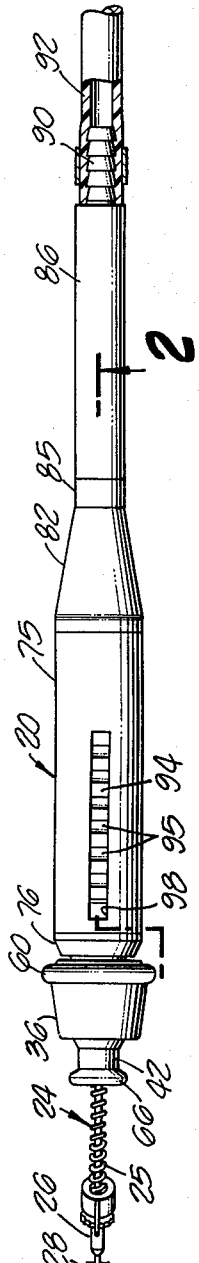

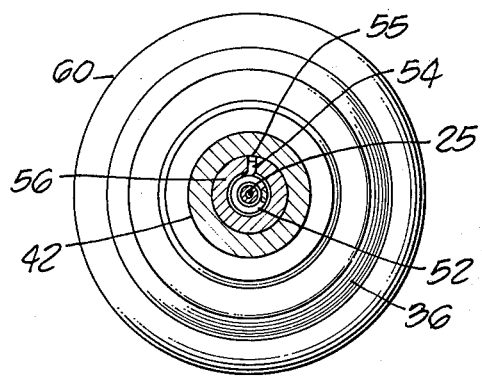
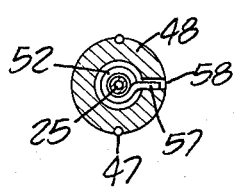
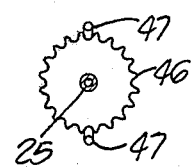
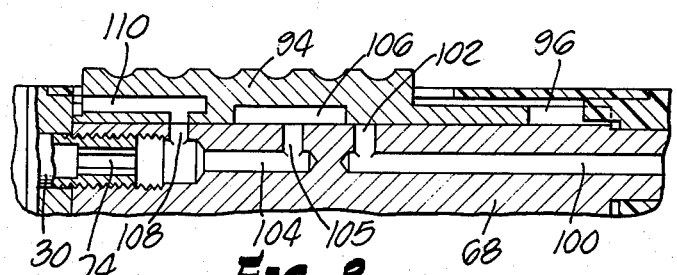
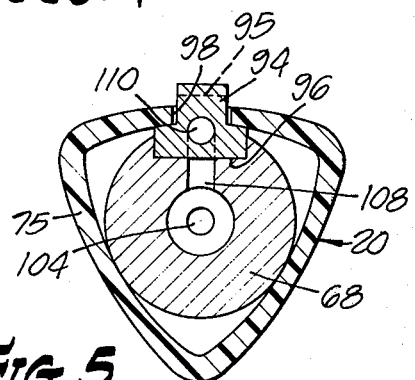
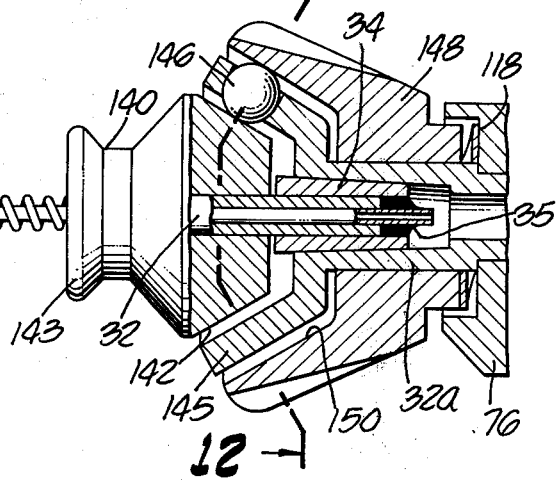
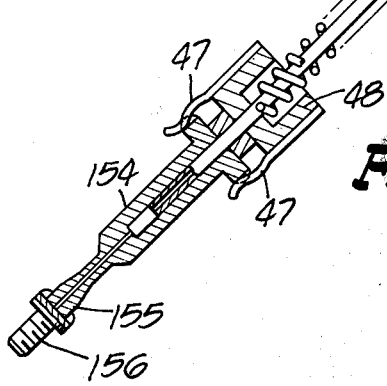
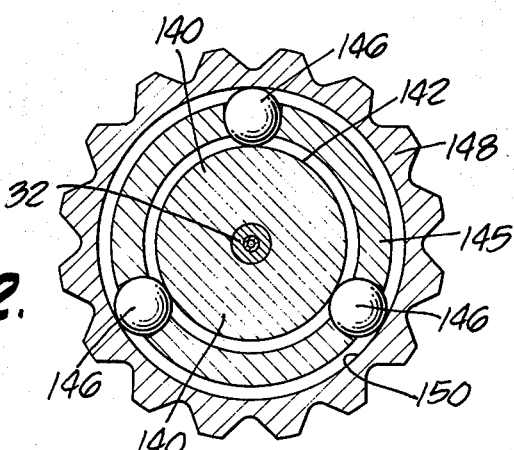

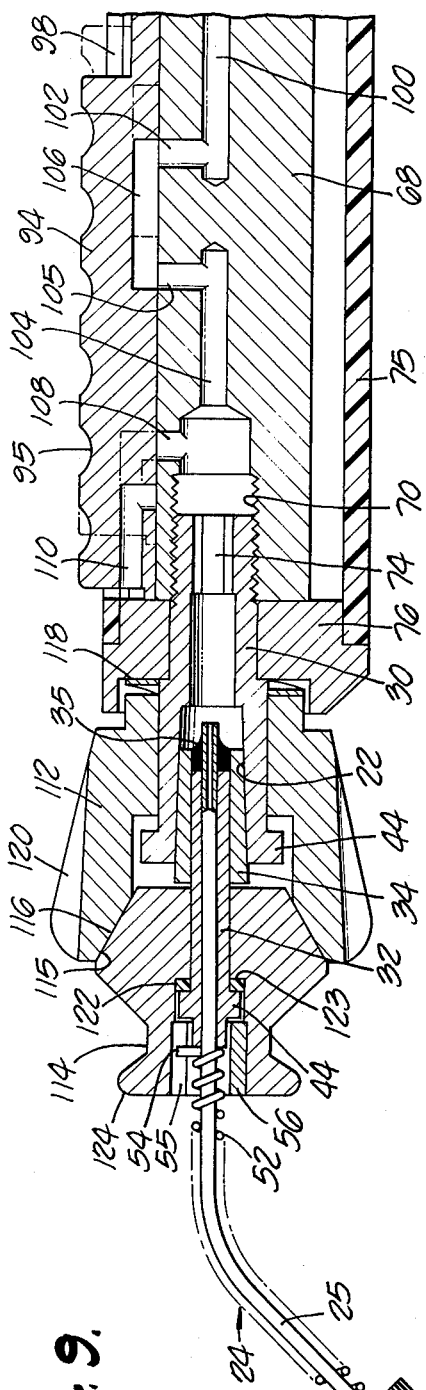
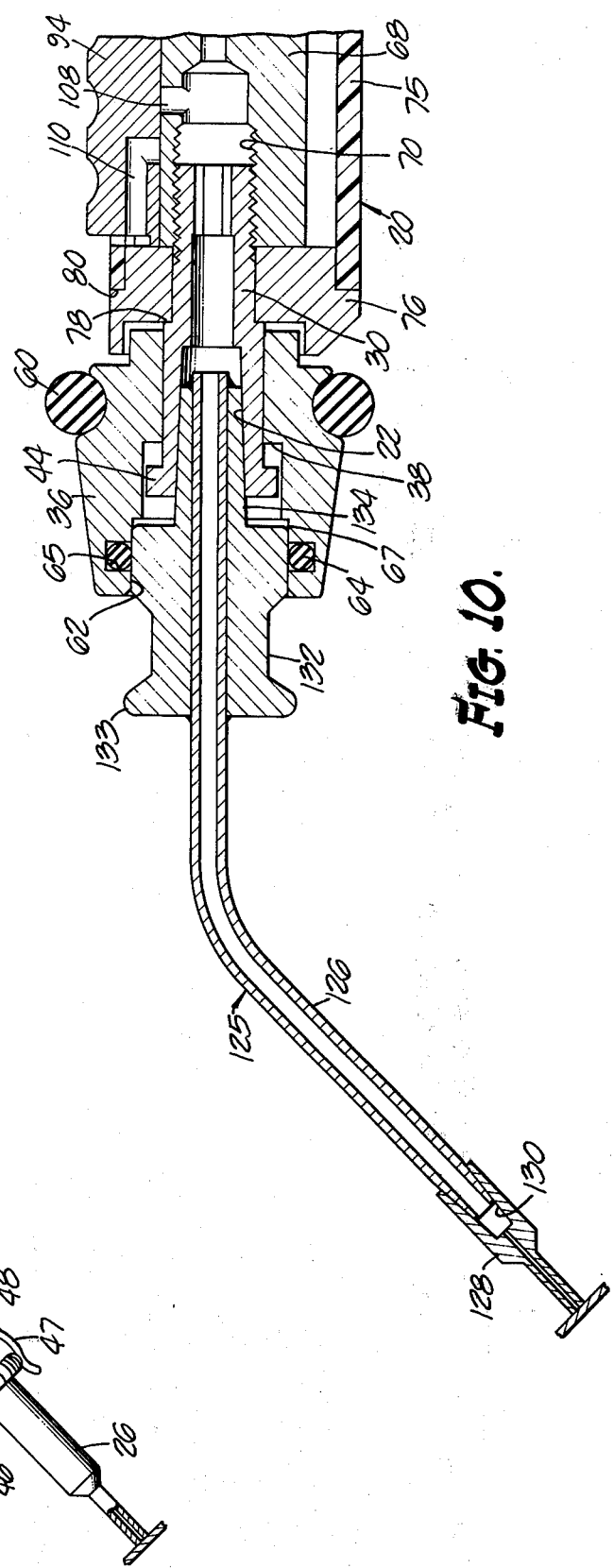
Fig. 9.
Fig. 10.

VACUUM-ACTUATED PICK-UP INSTRUMENT

BACKGROUND OF THE INVENTION

This invention relates to a vacuum pick-up instrument of the general character disclosed in the Lasto et al. U.S. Pat. No. 3,071,402 and in IBM Technical Disclosure Bulletin Volume 9, No. 7. More particularly, the invention relates to a pick-up instrument of the general type disclosed in the Weber U.S. Pat. No. 1,449,358 and in the U.S.S.R. Pat. No. 248,952, wherein the instrument has manually operable means to rotate the picked up object.

SUMMARY OF THE INVENTION

The instrument has a pencil-size body equipped with a finger-operated slide valve that controls an air passage in the body which is in communication with a suitable vacuum source. Projecting forward from the body of the instrument is a first hollow axle which is in communication with the air passage and which carries a rotary finger control member. What may be termed a probe assembly is removably connected to the instrument body to permit the use of a plurality of such probe assemblies interchangeably. The probe assembly comprises a rigid metal air tube with a tip member on its outer end to pick up small objects by vacuum action, the tip member being rotatable to rotate the picked up objects. The rigid air tube is mounted in a second hollow axle that releasably plugs into the first hollow axle to make the probe assembly conveniently replaceable. This second hollow axle carries a rotary hub member that is releasably operatively connected to the finger control member for rotation thereby and suitable means operatively connects the rotary hub member to the rotary tip for rotation of the rotary tip by the finger control member. In the present disclosure, the means for operatively connecting the rotary hub member to the rotary tip member comprises a coiled spring that rotatably embraces the rigid air tube.

In one embodiment of the invention, the finger control member frictionally drives the rotary hub member by means of an O-ring that embraces the hub member and is seated in an inner circumferential groove of the finger control member. In another embodiment of the invention, a conical portion of the finger control member is urged by spring action against a corresponding conical portion of the rotary hub member. In some embodiments of the invention the rotary finger control member is slidable on the first hollow axle and whenever it is desired to replace the probe assembly, the finger control member is simply pushed forward against the rotary hub member to unplug the probe assembly.

A feature of one embodiment of the invention is the incorporation of motion-multiplying means to amplify the rotation that is transmitted to the rotary hub member by the finger control member. For this purpose a fixed bearing race unitary with the first hollow axle is interposed between the finger control member and the rotary hub member and the bearing race captivates a series of rotary bearing elements in the form of balls that are in peripheral contact with both the finger control member and the rotary hub member.

The features and objects of the invention may be understood from the following detailed description and the accompanying drawings.

BRIEF DESCRIPTION OF THE DRAWINGS

In the drawings, which are to be regarded as merely illustrative:

FIG. 1 is a plan view of a first embodiment of the invention;

FIG. 2 is an enlarged sectional view taken along the line 2—2 of FIG. 1 showing the slide valve in open position;

FIG. 3 is an enlarged fragmentary sectional view of the probe assembly and the forward end of the instrument body into which the probe assembly is removably plugged;

FIG. 4 is a transverse section along the line 4—4 of FIG. 3 showing how the inner end of a coiled spring is connected to the rotary hub member;

FIG. 5 is a transverse section along the line 5—5 of FIG. 3 showing how a manually operable slide valve is mounted on the body and retained by a body sheath or shell of generally triangular cross sectional configuration;

FIG. 6 is a transverse section along the line 6—6 of FIG. 3 showing how the outer end of the coiled spring is connected to a rotary member that releasably engages the rotary tip member of the instrument;

FIG. 7 is a transverse section along the line 7—7 of FIG. 3;

FIG. 8 is a fragmentary longitudinal section of the instrument body showing the slide valve in closed position;

FIG. 9 is an enlarged fragmentary sectional view of a second embodiment of the invention;

FIG. 10 is a similar view of a third embodiment of the invention;

FIG. 11 is a similar view of a fourth embodiment of the invention which incorporates means to amplify the rotation that is transmitted to the rotary tip member of the probe assembly; and FIG. 12 is a transverse section along the line 12—12 of FIG. 11.

DESCRIPTION OF THE SELECTED EMBODIMENTS OF THE INVENTION

Referring to FIGS. 1–8 that illustrate the first embodiment of the invention, the instrument has a pencil-size body, generally designated 20, with a tapered socket 22 (FIG. 3) on its forward end into which a forwardly extending probe assembly, generally designated 24, may be removably plugged. The probe assembly 24 comprises essentially a bent rigid air tube 25 that is adapted at its inner end to be plugged into the socket 22 and at its outer end carries a replaceable rotary tip member 26 to pick up small objects such as a small rectangular silicon chip or wafer 28. The tapered socket 22 on the body 20 is formed by what may be termed a first hollow axle 30 and the rear end of the air tube 25 is mounted in a second hollow axle 32 that is shaped and dimensioned to plug into the tapered socket in a fluid-tight manner. In the construction shown in FIG. 3, the inner end of the air tube 25 extends through the second hollow axle 32 and a tapered sleeve 34 on the second hollow axle is bonded both to the second hollow axle and to the inner end of the air tube 25 by welding 35.

The first hollow axle 30 serves as a bearing for a rotary annular means in the form of a finger control member 36 which, preferably, is not only freely rotatable but is also free to slide axially over a given range of movement between a rear limit position abutting the instrument body 20 and a forward limit position at which an inner circumferential shoulder 38 of the finger control member abuts an outer circumferential shoulder in the form of a radial end flange 40 of the first hollow axle. The second hollow axle 32 that plugs into the first hollow axle serves as a bearing for a rotary hub member 42 which is retained by a circumferential shoulder in the form of a radial flange 44 of the second hollow axle in cooperation with an inner circumferential shoulder 45 of the rotary hub member.

The rotary tip member 26 of the probe assembly rotatably embraces the outer end of the air tube 25 and has a serrated radial flange 46 that is releasably engaged by a pair of resilient wire jaws 47 of a retainer 48. The retainer 48 is rotatably mounted on the air tube 25 in abutment with a fixed collar 50 of the air tube.

Various suitable means may be employed within the scope of the invention to operatively connect the rotary hub member 42 to the rotary retainer. In this first embodiment, a wire spring 52 formed with open coils rotatably embraces the air tube 25 with the rear end 54 of the wire coil extending into an inner longitudinal slot 55 in a tubular insert 56 of the rotary hub member 42 as shown in FIG. 3 and, as shown in FIGS. 2 and 6, with the outer end 57 of the wire spring extending into a radial slot 58 of the retainer 48. It is apparent that rotation of the hub member 42 causes similar rotation of the rotary tip member 26 by the rotary retainer 48.

The finger control member 36 may be embraced by a suitable O-ring 60 that serves as a comfortable finger piece and the finger control member may be adapted in any suitable manner for releasable operative engagement with the rotary hub member 42 of the probe assembly 24. In the construction shown in FIG. 3, the rotary hub member 42 has an axially extensive cylindrical surface 62 and an O-ring 64 is seated in an inner circumferential groove 65 of the finger control member 36 to yieldingly grip the cylindrical surface to cause the rotary hub member to be actuated by the finger control member. It is apparent that when the second hollow axle 32 is plugged into the first hollow axle 30, the rotary hub member 42 of the probe assembly is simultaneously plugged into the rotary finger control member 36.

The hub member 42 has a circumferential bead 66 that may be grasped to unplug the probe assembly 24, but a feature of the invention is that the finger control member 36 not only drives the rotary hub member but also may serve as convenient means for unplugging the second hollow axle 32 from the first hollow axle 30 to free the probe assembly 24 for replacement by another probe assembly. For this purpose, the finger control member 36 is formed with an inner circumferential shoulder 67 (FIG. 3) to abut the inner end of the rotary hub member 42 and the previously mentioned range of longitudinal sliding movement of the finger control member is sufficient to permit the finger control member to push the rotary hub member 42 forwardly a distance sufficient to cause disengagement of the second hollow axle 32 from the first hollow axle 30. Normally, the inner circumferential shoulder 38 of the finger control member 36 is spaced rearwardly from the end flange 40 of the first hollow axle 30 as shown in FIG. 3. If the finger control member is pushed forward from the normal position shown in FIG. 3, however, the inner circumferential shoulder 67 of the finger control member abuts the inner end of the rotary hub member 42 well in advance of abutment of the inner circumferential shoulder 38 of the finger control member with the end flange 40 of the first hollow axle 30. It is to be noted that the axial extent of the cylindrical surface 62 of the hub member 42 is at least equal to said range of sliding movement of the finger control member.

The body 20 of the instrument may be of any suitable construction, but there are special advantages in the particular construction shown in FIGS. 1 and 2. The body 20 is made in a number of sections comprising: a longitudinal core 68 which is formed at its forward end with an internally threaded bore 70 and is provided with an extensive external screw thread 72 at its rear end; the previously mentioned first hollow axle 30 which, in effect, is an extension of the core 68 and threads into the bore 70, the bore of the first hollow axle having a hexagonal portion 74 to receive a tool for the purpose of assembly; a sheath or shell 75 which is of triangular cross sectional configuration as indicated in FIG. 5; a forward end wall 76 mounted on the first axle member 30 and backed against a circumferential shoulder 78 of the hollow axle, the periphery of the end wall being cut away to telescope into the forward end of the sheath 75 and to provide an outer circumferential shoulder 80 in abutment with the forward edge of the sheath; a tapered rear body section 82 which is slidably mounted on the core 68 and is cut away to telescope into the rear end of the sheath 75 and to form a circumferential shoulder 84 in abutment with the rear edge of the sheath; a circular nut 85 which engages the screw thread 72 of the core 68 and which may be tightened against the rear body section 82 to tighten the clamping of the sheath 75 between the end wall 76 and the cooperative rear body section 82; and a tail piece 86 which is threaded onto the rear end of the core 68 and is sealed by an O-ring 88 that embraces the core, the rear end of the tail piece forming a nipple 90 for engagement by a flexible air hose 92 that communicates with a suitable vacuum source such as a vacuum pump (not shown).

As shown in FIGS. 2 and 8, a longitudinal valve member 94 having serrations 95 to facilitate finger operation is slidingly mounted in a longitudinal groove 96 on the upper side of the core 68 with the valve member protruding through a longitudinal slot 98 in the sheath 75. A suitable air passage extending longitudinally through the body 20 places the threaded bore 70 at the front end of the core in communication with the vacuum source under control of the finger-operated slide valve 94.

In the construction shown, a rearward longitudinal passage 100 in the body core 68 terminates at its forward end at a radial bore 102 to the bottom of the groove 96 in which the valve member 94 slides. A second forward air passage 104 in the core terminates at its rear end at a radial bore 105 which also terminates in the bottom of the groove 96. The slidable valve member 94 has a longitudinal recess 106 on its underside that bridges the two radial bores 102 and 105 when the valve member is in its open position shown in FIG. 2. At that time a radial vent bore 108 to the bottom of the groove 96 is closed by the valve member. When the valve member 94 is in its alternate closed position shown in FIG. 8, it covers the radial bore 102 to cut off the vacuum source and at the same time a passage 110 in the valve member places the radial bore 108 in communication with the atmosphere to vent the recess 106 of the valve member and at the same time to vent the air tube 25 of the probe assembly to cause the rotary tip member 26 to release any object with which it may be engaged.

The manner in which this first embodiment of the invention functions for its purpose may be readily understood from the foregoing description. The slide valve 94 may be placed at its rearmost open position shown in FIG. 2 to create a vacuum in the air tube 25 of the probe assembly and thereby cause the rotary tip member 26 to pick up a small object by vacuum action. Once a small object such as the chip or wafer 28 is engaged by the tip member 26, the tip member may be rotated by manipulation of the finger control member 36. The small object 28 may be released at will by shifting the slide valve 94 to its rearward closed position shown in FIG. 8.

It is a simple matter to substitute one rotary tip member 26 for another. It is also a simple matter to dislodge the probe assembly from the tapered socket 22 of the instrument body either by grasping the circumferential bead 66 of the hub member 42 or by thrusting the finger control member 36 forward against the hub member.

The described sectionized construction of the instrument body 20 makes the instrument structure relatively inexpensive and greatly simplifies the fabrication of the instrument body. It will also be apparent that the sectionalized body structure may be largely used economically for several different embodiments of the instrument.

The second embodiment of the invention shown in FIG. 9 is largely identical with the first embodiment as indicated by the use of corresponding reference numerals to indicate corresponding parts. The essential difference is in the manner that a rotary finger control member 112 on the first hollow axle 30 releasably engages a rotary hub member 114 on the second hollow axle 32. The rotary hub member 114 has a rearwardly tapered surface 115 and the finger control member 112 has a corresponding inner circumferential tapered surface 116 and a spring washer 118 that embraces the first hollow axle 30 urges the finger control member 112 forward to provide the required pressure between the mating tapered surfaces 115 and 116. The finger control member 112 has a series of longitudinal ribs 120 to facilitate rotation by finger pressure.

Since the spring washer 118 normally urges the rotary hub member 114 against the radial flange 44 of the second hollow axle 32, a washer 122 of suitable low friction material such as Teflon may be interposed between the radial flange and the cooperating inner circumferential shoulder 123 of the rotary hub member. It is to be noted that here too, the finger control member 112 has the capability of sliding forward from the normal position shown in FIG. 9 for the purpose of exerting thrust against the rotary hub member 114 to unplug the probe assembly 24. The probe assembly may also be unplugged by grasping a circumferential bead 124 of the rotary hub member 114.

If manual rotary control of a tip member is not required, the probe assembly 125 illustrated in FIG. 10 may be substituted for the probe assembly 24 of the first two embodiments of the invention. The probe assembly 125 comprises a rigid air tube 126 that carries at its outer end a removable tip member 128 that has a conical socket 130 to engage the correspondingly tapered end of the air tube 126. In the construction shown, a hub member 132 having a peripheral bead 133 is rigidly mounted on the air tube 126 and has a tapered tubular extension 134 that is welded to the rear end of the air tube. Thus, the probe assembly 125 is a rigid assembly with no movable parts. The tubular extension 134 fits into the conical socket 22 of the forwardly extending hollow axle 30 and the periphery of the fixed hub member 132 fits into the O-ring 64 of a previously described finger control member 36. The probe assembly 125 may be unplugged by grasping the peripheral bead 133 of the hub member 132.

The substitution of the probe assembly 125 frictionally immobilizes the finger control member 36. Thus, the structure of the instrument body 20 and the finger control member 36 thereon is the same as in the first embodiment of the invention so that the first embodiment may be converted into the embodiment shown in FIG. 10 by simply substituting the probe assembly 125 for the previously described probe assembly 24.

The instrument construction shown in FIG. 11 is largely identical with the first embodiment of the invention, as indicated by the use of corresponding numerals to designate corresponding parts, but differs in the incorporation of means to amplify the rotation that is transmitted to the rotary retainer 48. For this purpose the second hollow axle 32 carries a rotary hub member 140 that has a conical rear surface 142, the rotary hub member having a peripheral bead 143 and being similar to if not identical with the rotary hub member 114 of FIG. 9. A finger control member 148 is mounted on a first hollow axle 32a which differs from the previously described first hollow axle 32 of the first embodiment of the invention in having an integral conical ball race 145 instead of an end flange. As shown in FIG. 12, the fixed ball race 145 has three equally spaced apertures that captivate three corresponding balls 146. The finger control member 148, which is rotatably mounted on the first hollow axle 32a, has a forwardly facing conical surface 150 which imparts rotation to the three balls 146 and thereby imparts reverse rotation to the rotary hub member 140. Since the diameter of the portion of the rotary hub member 140 that is in rolling contact with the three balls 146 is substantially less than the diameter of the portion of the finger control member 148 that makes contact with the three balls, the rate of rotation of the rotary hub member is correspondingly increased and may be approximately doubled.

The construction shown in FIGS. 11 and 12 is especially advantageous when the probe assembly 152 is provided with a special rotary tip member 154 that has a leading edge or blade 155 shaped to engage the slot in a miniature screw 156 for driving the screw into a threaded bore of a small scale assembly. With the rotation of the tip member 154 amplified, the number of rotations of the finger control member 148 that are required to install the screw 156 is greatly reduced.

The description herein of the selected embodiments of the invention will suggest various changes, substitutions and other departures from the disclosure within the spirit and scope of the appended claims.

We claim:

1. In a vacuum-actuated pick-up instrument for handling small objects, the combination of:
   an elongated body forming a passage for communication with a controlled vacuum source;
   a first hollow axle in communication with said air passage and extending rigidly forward from said body;

a second hollow axle separate from the body,
one of said hollow axles forming a socket to permit the other of the hollow axles to be removably plugged into the socket;
an air tube mounted in said second hollow axle and extending forwardly therefrom;
a tip member rotatably mounted on an outer end of the air tube to engage small objects by vacuum action;
a hub member rotatably mounted on said second hollow axle;
a finger control member rotatably mounted on said first hollow axle and releasably operatively connected to said hub member to impart rotation thereto;
elongated flexible means rotatably embracing said air tube with a rear end of the flexible means connected to said hub member for rotation thereby,
a forward end of the flexible means being connected to said tip member to impart rotation thereto,
said hub member having a tapered outer circumferential surface;
said finger control member having a correspondingly tapered inner circumferential surface;
and means yieldingly urging the finger control member to cause the tapered surface of the finger control member to frictionally engage the tapered surface of the hub member.

2. In a vacuum-actuated pick-up instrument for handling small objects, the combination of:
an elongated body forming an inner air passage for communication with a controlled vacuum source;
an air tube to pick up objects by vacuum action;
cooperative means on an inner end of the air tube and on a forward end of the body, respectively, releasably connecting the inner end of the air tube with said air passage in the body;
a hub member surrounding the air tube forwardly of said cooperative means; and
annular means on the forward end of the body surrounding said cooperative means and extending forward therefrom,
said annular means forming a socket forwardly of said cooperative means to embrace the hub member and to cooperate with said cooperative means to stabilize the rigid air tube, said annular means being slidable forwardly against the hub member to cause disconnection of said cooperative means.

3. In a vacuum-actuated pick-up instrument for handling small objects, the combination of:
an elongated body forming an inner air passage for communication with a controlled vacuum source;
an air tube to pick up objects by vacuum action;
cooperative means on an inner end of the air tube and on a forward end of the body, respectively, releasably connecting the inner end of the air tube with said air passage in the body;
a hub member surrounding the air tube forwardly of said cooperative means; and
annular means on the forward end of the body surrounding said cooperative means and extending forward therefrom,
said annular means forming a socket forwardly of said cooperative means to embrace the hub member and to cooperate with said cooperative means to stabilize the rigid air tube and including yielding means to create pressure against the periphery of the hub member when the hub member is in said socket.

4. In a vacuum-actuated pick-up instrument for handling small objects, the combination of:
an elongated body forming an inner air passage for communication with a controlled vacuum source;
an air tube to pick up objects by vacuum action;
cooperative means on an inner end of the air tube and on a forward end of the body, respectively, releasably connecting the inner end of the air tube with said air passage in the body;
a hub member surrounding the air tube forwardly of said cooperative means; and
annular means on the forward end of the body surrounding said cooperative means and extending forward therefrom,
said annular means forming a socket forwardly of said cooperative means to embrace the hub mebmer and to cooperate with said cooperative means to stabilize the rigid air tube, said socket having an inner circumferential groove and an elastomer ring seated in said groove and extending radially inwardly thereof to yieldingly embrace said hub under pressure.

5. In a vacuum-actuated pick-up instrument for handling small objects, the combiation of:
an elongated body forming an inner air passage for communication with a controlled vacuum source;
an air tube to pick up objects by vacuum action;
cooperative means on an inner end of the air tube and on a forward end of the body, respectively, releasably connecting the inner end of the air tube with said air passage in the body;
a hub member surrounding the air tube forwardly of said cooperative means; and
annular means on the forward end of the body surrounding said cooperative means and extending forward therefrom,
said annular means forming a socket forwardly of said cooperative means to embrace the hub member and to cooperate with said cooperative means to stabilize the rigid air tube, said hub member and said annular means having mutually contacting tapered surfaces;
and spring means urging said annular means forwardly to create pressure at the mutually contacting surfaces.

6. In a vacuum-actuated pick-up instrument for handling small objects, the combination of:
an elongated body forming a passage for communication with a controlled vacuum source;
a first hollow axle in communication with said air passage and extending rigidly forward from said body;
a second hollow axle separate from the body,
one of said hollow axles forming a socket to permit the other of the hollow axles to be removably plugged into the socket;
an air tube mounted in said second hollow axle and extending forwardly therefrom;
a tip member rotatably mounted on an outer end of the air tube to engage small objects by vacuum action;
a hub member rotatably mounted on said second hollow axle;
a finger control member rotatably mounted on said first hollow axle and releasably operatively connected to said hub member to impart rotation thereto;

elongated flexible means rotatably embracing said air tube with a rear end of the flexible means connected to said hub member for rotation thereby, a forward end of the flexible means being connected to said tip member to impart rotation thereto, said first hollow axle having a first rearwardly facing outer circumferential shoulder to retain the finger control member thereon;

the second hollow axle having a second rearwardly facing circumferential shoulder to retain the hub member thereon;

the finger control member being slidable on the first hollow axle;

a portion of the finger control member providing an abutment for engaging the hub member when the finger control member is slid axially towards said first circumferential shoulder;

and in which the range of axial movement of the finger control member permitted by said first outer circumferential shoulder permits the finger control member to drive said hub member against the second circumferential shoulder before the finger control member reaches the first circumferential shoulder thereby to permit the finger control member to forcibly release the second hollow axle from the first hollow axle.

7. A combination as set forth in claim 6 in which the hub member has an outer cylindrical surface of an axial extent at least equal to said range;

and which includes resilient means extending radially inwardly from the finger control member to frictionally engage said cylindrical surface throughout said range of axial movement of the finger control member.

8. In a vacuum-actuated pick-up instrument for handling small objects, the combination of:

an elongated body forming a passage for communication with a controlled vacuum source;

a first hollow axle in communication with said air passage and extending rigidly forward from said body;

a second hollow axle separate from the body;

said first hollow axle forming a socket to permit the second hollow axle to be removably plugged into the socket;

an air tube mounted in said second hollow axle and extending forwardly therefrom;

a tip member rotatably mounted on an outer end of the air tube to engage small objects by vacuum action;

a hub member rotatably mounted on said second hollow axle;

a finger control member rotatably mounted on said first hollow axle and releasably operatively connected to said hub member to impart rotation thereto;

elongated flexible means rotatably embracing said air tube with a rear end of the flexible means connected to said hub member for rotation thereby, a forward end of the flexible means being connected to said tip member to impart rotation thereto, said finger control member being slidable axially on the first hollow axle;

a portion of the finger control member providing an abutment for engaging the hub member when the finger control member is slid axially forward, thereby to permit the finger control member to serve as manual means to withdraw the second hollow axle from the socket of the first hollow axle.

9. A combination as set forth in claim 8 in which said socket is of tapered configuration and said second hollow axle is correspondingly tapered to permit a relatively small axial movement of the second hollow axle to free the second hollow axle from said socket.

10. In a vacuum-actuated pick-up instrument for handling small objects, the combination of:

an elongated body forming a passage for communication with a controlled vacuum source;

a first hollow axle in communication with said air passage and extending rigidly forward from said body;

a second hollow axle separate from the body, one of said hollow axles forming a socket to permit the other of the hollow axles to be removably plugged into the socket;

an air tube mounted in said second hollow axle and extending forwardly therefrom;

a tip member rotatably mounted on an outer end of the air tube to engage small objects by vacuum action;

a hub member rotatably mounted on said second hollow axle;

a finger control member rotatably mounted on said first hollow axle and releasably operatively connected to said hub member to impart rotation thereto;

elongated flexible means rotatably embracing said air tube with a rear end of the flexible means connected to said hub member for rotation thereby, a forward end of the flexible means being connected to said tip member to impart rotation thereto;

said hub member having a tapered outer circumferential surface;

said finger control member having a correspondingly tapered inner circumferential surface;

a conical bearing race interposed between said two tapered surfaces; and bearing elements rotatably mounted in said bearing race in contact with both of said tapered surfaces to impart rotation from the finger control member to the hub member.

11. A combination as set forth in claim 10 which includes spring means to urge said finger control member towards said hub member to place said bearing elements under compression.

12. A combination as set forth in claim 11 in which said bearing race is integral with said first hollow axle.

13. In a vacuum-actuated pick-up instrument for handling small objects, the combination of:

an elongated body forming a passage for communication with a controlled vacuum source;

a first hollow axle in communication with said air passage and extending rigidly forward from said body;

a second hollow axle separate from the body, one of said hollow axles forming a socket to permit the other of the hollow axles to be removably plugged into the socket;

an air tube mounted in said second hollow axle and extending forwardly therefrom;

a tip member rotatably mounted on an outer end of the air tube to engage small objects by vacuum action;

a hub member rotatably mounted on said second hollow axle;

a finger control member rotatably mounted on said first hollow axle releasably and frictionally engaging said hub member to impart rotation thereto;

elongated flexible means rotatably embracing said air tube within a rear end of the flexible means connected to said hub member for rotation thereby, a forward end of the flexible means being connected to said tip member to impart rotation thereto; and an elastomer ring seated in an inner circumferential groove of the finger control member extending radially inwardly from the groove to frictionally engage the hub member.

* * * * *